United States Patent Office 3,437,659
Patented Apr. 8, 1969

3,437,659
SYNTHESIS FOR HETEROCYCLAMMONIUM BETAINES
Henri Larive, Clichy, and Roger Baralle, Champigny-sur-Marne, France, assignors to Eastman Kodak Company, Rochester, N.Y., a corporation of New Jersey
No Drawing. Filed Mar. 22, 1965, Ser. No. 441,909
Claims priority, application France, Apr. 29, 1964, 972,790
Int. Cl. C07d 91/50, 33/60; C09b 23/00
U.S. Cl. 260—240                                6 Claims

ABSTRACT OF THE DISCLOSURE

New process for preparing heterocyclammonium sulfobetaines by reacting a heterocyclammonium salt with an alkali metal sulfite or an alkali metal bisulfite at approximately room temperature or slightly higher temperatures. Anhydro 1-methyl 2-sulfoquinolinium hydroxide, for example, can be prepared by reacting N-methyl-2-chloroquinolinium methyl sulfate with a solution of sodium sulfite in water. The sulfobetaine compounds are useful intermediates in the synthesis of sensitizing dyes, such as cyanine, merocyanine and styryl dyes, for example.

---

This invention is relates to the preparation of heterocyclammonium sulfobetaines used for the synthesis of photosensitizing dyes of the cyanine, carbocyanine and merocyanine series.

It is known to prepare heterocyclammonium sulfobetaines by the method of Gautier and Renault (Comptes Rendus, 1953, t. 237, p. 733) consisting of reacting methyl iodide with the silver salt of 2-sulfo substituted heterocyclic compounds. Another known procedure described in French Patent 1,058,482 of June 18, 1952 and in the first certificate of addition 69,622 attached to said patent, consists in quaternizing the sodium salt of the sulfonic acid of the heterocyclic compound. These processes have the inconvenience that the yields of the sulfobetaines are poor and therefore they are expensive to produce.

It is therefore an object of our invention to provide a simple and convenient synthesis that producs valuable heterocyclammonium sulfobetaines with very high yields even at room temperatures or slightly elevated temperatures.

Another object is to provide a valuable synthesis for heterocyclammonium sulfobetaines without the evolution of toxic products.

Another object is to provide a synthesis that produces heterocyclammonium sulfobetaines of a high degree of purity that are used to great advantage to produce valuable dyes that are devoid of impurities and therefore do not require the numerous recrystallization steps required to purify dyes produced by other synthesis.

Another object is to provide a valuable synthesis for making the heterocyclammonium sulfobetaines in non-anhydrous solvents and even in water.

Still other objects will be evident from the following specification and claims.

The procedure according to the invention is especially remarkable in that one reacts an alkali metal sulfite with a heterocyclammonium salt of the formula:

I 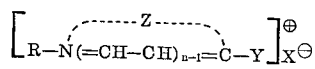

or a complex of the formula:

II 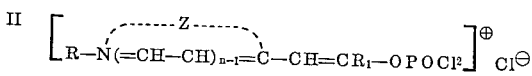

wherein $n$ represents an integer of from 1 to 2; Z represents the nonmetallic atoms necessary to complete a 5 to 6 membered heterocyclic nucleus, such as a thiazole nucleus (e.g., thiazole, 4-methylthiazole, 4-phenylthiazole, 5-methylthiazole, 5-phenylthiazole, 4,5-dimethylthiazole, 4,5-diphenylthiazole, 4-(2-thienyl)thiazole, etc.), a benzothiazole nucleus (e.g., benzothiazole, 4-chlorobenzothiazole, 5 - chlorobenzothiazole, 6 - chlorobenzothiazole, 7-chlorobenzothiazole, 4-methylbenzothiazole, 5-methylbenzothiazole, 6-methylbenzothiazole, 5-bromobenzothiazole, 6 - bromobenzothiazole, 4 - phenylbenzothiazole, 5-phenylbenzothiazole, 4 - methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, etc.), a naphthothiazole nucleus (e.g., α-naphthothiazole, β-naphthothiazole, 5-methoxy-β-naphthothiazole, 5-ethoxy-β-naphthothiazole, 8-methoxy-α-naphthothiazole, 7-methoxy-α-naphthothiazole, etc.), a thionaphtheno-7′,6′,4 5-thiazole nucleus (e.g., 4′-methoxythianaphtheno-7′,6′,4 5-thiazole, etc.), an oxazole nucleus (e.g., 4-methyloxazole, 5-methoxazole, 4-phenyloxazole, 4,5-diphenyloxazole, 4-ethyloxazole, 4,5-dimethyloxazole, 5-phenyloxazole, etc.), a benzoxazole nucleus (e.g., benzoxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole, 5-methoxybenzoxazole, 5-ethoxybenzoxazole, 5-chlorobenzoxazole, 6-methoxybenzoxazole, 5 - hydroxybenzoxazole, 6 - hydroxybenzoxazole, etc.), a naphthoxazole nucleus (e.g., α-naphthoxazole, β-naphthoxazole, etc.), a selenazole nucleus (e.g., 4-methylselenazole, 4-phenylselenazole, etc.), a benzoselenazole nucleus (e.g., benzoselenazole, 5-chlorobenzoselenazole, 5 - methoxybenzoselenazole, 5 - hydroxybenzoselenazole, tetrahydrobenzoselenazole, etc.), a naphthoselenazole nucleus (e.g., α-naphthoselenazole, β-naphthoselenazole, etc.), a thiazoline nucleus (e.g., thiazoline, 4-methylthiazoline, etc.), a 2-pyridine nucleus (e.g., 2-pyridine, 5-methyl-2-pyridine, etc.), a 4-pyridine nucleus (e.g., 4-pyridine, 3-methyl-4-pyridine, etc.), a 2-quinoline nucleus (e.g., 2-quinoline, 3-methyl-2-quinoline, 5-ethyl-2-quinoline, 6 - chloro - 2 - quinoline, 8-chloro-2-quinoline, 6-methoxy-2-quinoline, 8-ethoxy-2-quinoline, 8-hydroxy-2-quinoline, etc.), a 4-quinoline nucleus (e.g., 4-quinoline, 6-methoxy-4-quinoline, 7-methyl-4-quinoline, 8-chloro-4-quinoline, etc.), a 3,3-dialkylindolenine nucleus (e.g., 3,3-dimethylindolenine, 3,3,5-trimethylindolenine, 3,3,7-trimethylindolenine, etc.), an imidazole nucleus (e.g., imidazole, 1-alkylimidazole, 1-alkyl-4-phenylimidazole, 1-alkyl-4,5-dimethylimidazole, etc.), a benzimidazole nucleus (e.g., benzimidazole, 1-alkylbenzimidazole, 1-aryl-5,6-dichlorobenzimidazole, etc.), a naphthimidazole nucleus (e.g., 1-alkyl-α-naphthimidazole, 1-aryl-β-naphthimidazole, 1-alkyl-5-methoxy-β-naphthimidazole, etc.), etc.; R represents an alkyl groups (substituted or not), e.g., methyl, ethyl, sulfomethyl, sulfoethyl, sulfobutyl, carboxyethyl, etc., or an aryl group (substituted or not) (e.g., phenyl, tolyl, sulfophenyl, carboxyphenyl, etc.); $R_1$ represents a group such as, the hydrogen atom, an alkyl group (e.g., methyl, ethyl, butyl, benzyl, etc.), an aryl group (e.g., phenyl, tolyl, etc.); Y represents a halogen atom (e.g., chlorine, bromine, etc.), a phenoxy group, an OPOCl² group or a —SR group in which R is as defined previously; and X represents any acid anion, such as ethyl sulfate, methyl sulfate, p-toluenesulfonate, chloride, etc.

The described process is surprising. In effect, one knows the halogens in the α or γ position of a heterocycle have a certain mobility and can be replaced by substitution reactions. It is also known that alkali metal sulfites react with 2-halobenzothiazoles or 2-halobenzoxazoles but this reaction mixture must be refluxed, is slow and difficult and in general gives poor yields. In addition, one would expect in the application of this reaction on a quaternary salt where there is a net difference in reactivity between the covalent bond in position 2 or 4 and the ionic bond of the anion attached to the molecule, that only the anion would participate in the substitution reaction. One verifies according to the invention, that not only the atoms in the 2 or 4 position and the anion participate simultaneously in the substitution reaction with the direct formation of the desired sulfobetaine, but that this reaction, contrary to the reaction with the corresponding nonquaternary compounds, gives very high yields at room temperatures or slightly elevated temperatures. The process is applicable for the quaternary salts of basic heterocyclic nuclei that are valuable in the synthesis of dyes.

One is able to prepare the intermediates of Formula I by any known synthesis, as indicated in the following example. The compounds of Formula II and of Formula I where X represents chlorine and Y represents $OPOCl^2$, can be prepared by the reaction of phosphorous oxychloride on the corresponding ketone or ketomethylene compound.

According to another embodiment of the invention, particularly advantageous when the corresponding ketone or ketomethylene compound is readily available, one reacts successively phosphorous oxychloride, then an alkali metal sulfite on a compound of the formula:

I

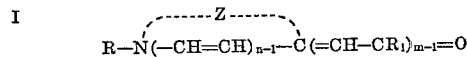

wherein Z, R, $R_1$ and $n$ are as described previously and $m$ is an integer of from 1 to 2. The desired sulfobetaine is easily obtained directly without isolating the chlorinated quaternary salt of the formula:

IV

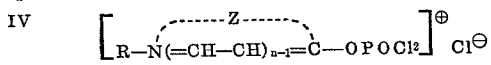

which is the intermediate formed when one uses the compound of Formula III when $m=1$ or the complex of Formula II which is the intermediate formed when one uses the compound of Formula III when $m=2$.

The heterocyclammonium sulfobetaines produced according to our invention include those represented to advantage by the formula:

V

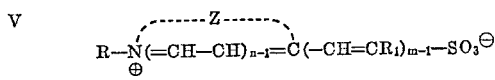

wherein R, $R_1$, Z, $n$ and $m$ are as defined previously.

Any of the alkali metal sulfites including sodium sulfite, potassium sulfite, lithium sulfite, etc. and alkali metal metabisulfites, including sodium metabisulfite, potassium metabisulfite, lithium metabisulfite, etc. are used to advantage in our process.

The compounds of Formula V are used to advantage as intermediates in the synthesis of dyes in which the heterocyclic basic nuclei are used, for example, the cyanine dye class, the merocyanine dye class, the styryl dye class, etc.

Cyanine dyes are made by condensing a compound of Formula V with a compound having the formula:

VI

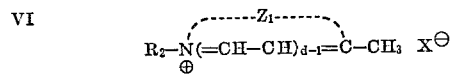

wherein $R_2$ represents an alkyl group (substituted or not), e.g., methyl, ethyl, sulfomethyl, sulfoethyl, sulfobutyl, carboxyethyl, etc., or an aryl group (substituted or not) (e.g., phenyl, tolyl, sulfophenyl, carboxyphenyl, etc.); $Z_1$ represents the nonmetallic atoms required to complete a 5 to 6 membered heterocyclic nucleus such as have been described for Z; and $d$ represents an integer of from 1 to 2; in the presence of a basic condensing agent, such as triethylamine, N,N-dimethylaniline, pyridine, etc. and and any of the other tertiary amines commonly used as a basic condensing agent, and preferably in an inert solvent at a temperature between room temperature and the reflux temperature. The X in Formula VI represents and acid anion defined previously.

The merocyanine dyes are made by conventional methods by condensing a compound of Formula V with a compound having the formula:

VII

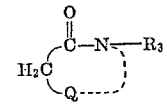

wherein $R_3$ represents an alkyl group (e.g., methyl, ethyl, butyl, dodecyl, octadecyl, etc.), and aryl group (e.g., phenyl, tolyl, etc.) and Q represents a group, such as

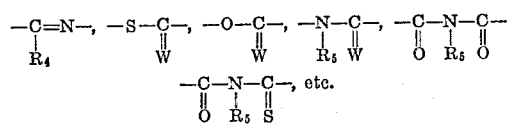

in which $R_4$ represents any of the groups used on the 3-position of 2-pyrazolin-5-ones, e.g., hydrogen, alkyl (e.g., methyl, isopropyl, tertiary butyl, hexyl, etc.), aryl (e.g., phenyl, tolyl, halophenyl, etc.), substituted amino (e.g., methylamino, diethylamino, phenylamino, etc.), substituted carbonamido (e.g., ethylcarbonamido, phenylcarbonamido, etc.), substituted sulfonamido (e.g., butylsulfonamido, phenylsulfonamido, etc.), substituted sulfamyl (e.g., propylsulfamyl, phenylsulfamyl, etc.), substituted carbamyl (e.g., ethylcarbamyl, phenylcabamyl, etc.); W represents a member selected from the class consisting of sulfur, oxygen and selenium and $R_5$ represents a member selected from the class consisting of hydrogen, an alkyl group and an aryl group. The condensations are advantageously carried out in the presence of a basic condensing agent such as were mentioned previously. It is advantageous to use inert solvents and to heat the reaction mixture to a temperature between room temperature and the reflux temperature.

The easily obtained sulfobetaines permit the preparation of sensitizing dyes of the cyanine, carbocyanine and merocyanine series. In a number of instances and especially in the synthesis of cyanines or of merocyanines, which contain the quinoline nucleus, the sythesis of these sensitizing dyes from the sulfobetaine intermediates prepared according to our invention, provide notable advantages in comparison to other known processes. Among the advantages provided by use of sulfobetaines over the classical methods using a reactive halogen, alkylthio group or arylthio group requiring a much greater reactivity, are therefore (1) an easier synthesis, (2) the possibility of operating in nonanhydrous solvents or even in water, (3) the absence of any evolution of noxious products whose elimination is absolutely necessary, (4) a considerable increase in yield, which is sometimes quadrupled and (5) the production of absolutely pure dye devoid of side products, dyes which do not have to be recrystallized a great number of times to eliminate undesirable sensitization in the red which is very frequently present when one obtains the dyes by the classical methods.

In the instance of sulfobetaines of the pyridine nucleus, the balanced reactivity of the $-SO_3^\ominus$ group on the pyridine compared to the electronegative substituents such as chlorine, bromine, iodine, the phenoxy group, $-SR$ group, or a phenylthio group permits easy access to merocyanines of the rhodanine type or oxazolidinedione type with yields notably higher than those obtained with known processes, and gives dyes of very high quality.

The following examples illustrate but do not limit the invention.

EXAMPLE 1

Anhydro 1-methyl-4-sulfoquinolinium hydroxide

A concentrated solution of sodium sulfite (12.6 g., 0.1 mole in 36 ml. of water) was rapidly poured upon 28.95 g. (0.1 mole) of N-methyl-4-chloroquinolinium methylsulfate. There was at first a solution of all the products, then precipitation of the betaine of the formula:

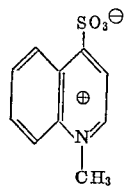

The betaine was separated and washed with a very small quanttiy of ice water, then acetone. After recrystallization from acetic acid, 16 g. (72% yield) of product was obtained, M. P. 331° C.

The N-methyl-4-chloroquinolinium methyl sulfate was prepared as follows. To a suspension of 16.3 g. (0.1 mole) of 4-chloroquinoline in 20 ml. of acetone, at the reflux temperature, was added 12.6 g. (0.1 mole) of dimethyl sulfate. For two hours the reaction mixture was heated at reflux temperature, then chilled. The product was separated in the form of an oil by the addition of ether. The decanted oil was crystallized by addition of acetone, then filtered, and gave 20 g. (68% yield) of the desired product.

The 4-chloroquinoline was prepared by the following method. In a three necked flask fitted with an agitator, a dropping funnel and a condenser, a solution of 145 g. (1 mole) of N-oxyquinoline in 700 ml. of benzene previously dried over sodium, was brought to reflux. The heating was stopped and 153.5 g. (1 mole) of fractionally distilled phosphorous oxychloride was slowly introduced so that refluxing was maintained. At the same time that hydrochloric acid was released, a dense oil separated. After the addition of about 100 g. of phosphorous oxychloride, refluxing stopped. A quarter of a hour after completion of the addition, the reaction mixture was heated to reflux temperature. On being neutralized by adding a cold saturated sodium carbonate solution, the mixture separated into two layers. The 4-chloroquinoline was extracted in the benzene and the solution dried over sodium carbonate. The benzene was removed and the product 105 g. (68% yield) distilled at 80° C. under a pressure of 0.08 mm. of mercury.

EXAMPLE 2

Anhydro 1-ethyl-4-sulfoquinolinium hydroxide

The same process described for Example 1 was used but N-methyl-4-chloroquinolinium methyl sulfate was replaced by N-ethyl-4-chloroquinolinium ethyl sulfate. The sulfobetaine obtained had a melting point of 273° C.

EXAMPLE 3

Anhydro 3-methyl-2-sulfo-β-naphthothiazolium hydroxide

In 200 ml. of acetone was placed 27 g. (0.1 mole) of 2-chloro-3-methyl-β-naphthothiazolium chloride. While agitating, 38 g. (0.2 mole+100% excess) of sodium metabisulfite dissolved in 150 ml. of water was added. The mixture was energetically agitated at room temperature, filtered, washed with cold water, then acetone. The sulfobetaine product 10 g. (35% yield) had a melting point of 347° C.

The 2-chloro-3-methyl-β-naphthothiazolium chloride was prepared as follows. To a solution of 20.3 g. (0.1 mole) of N-methyl-β-naphthothiazolone in 50 ml. of phosphorous oxychloride was added with agitation, 21 g. (0.10 mole) of phosphorous pentachloride. All the products were dissolved with release of heat. After completion of the addition, the mixture was agitated at room temperature for an hour, then washed successively with benzene and ether, and dried under vacuum. The hygroscopic product obtained was used directly for preparing the betaine.

EXAMPLE 4

Anhydro 3-methyl-2-sulfobenzothiazolium hydroxide

A cold saturated solution of 0.63 g. (0.005 mole) of sodium sulfite in 1.5 ml. of water was poured rapidly upon 1.15 g. (0.005 mole) of 2-chloro-3-methylbenbothiazolium chloride. There was simultaneously a solution of the quaternary salt and precipitation of the betaine of the formula:

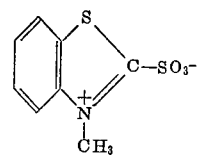

The product was washed with cold water, then acetone and air dried at room temperature. There was obtained 1.6 g. (70%) of the betaine with a melting point of 330° C.

The 2-chloro-3-methylbenzothiazolium chloride was prepared as follows. To a suspension of 33 g. (0.2 mole) of N-methylbenzothiazolone and of 100 ml. of phosphorous oxychloride was added 41.7 g. (0.2 mole) of phosphorous pentachloride. The mixture was heated at reflux four hours, then chilled. The precipitated product was washed two times with 200 ml. of cold chloroform, with 100 ml. of o-dichlorobenzene, then in acetone. There was obtained 86.5 g. (66% yield) of 2-chloro-3-methylbenzothiazolium chloride.

EXAMPLE 5

Anhydro 1-methyl-2-sulfoquinolinium hydroxide

A solution was made of 12.6 g. (0.1 mole) of sodium sulfite in 36 ml. of water. While agitating, the said solution was rapidly added to 29 g. (0.1 mole) of N-methyl-2-chloroquinolinium methyl sulfate. All the material dissolved giving a red coloration, then the betaine precipitated. It was filtered, and washed with water and then acetone. There was obtained 17.8 g. (79% yield) of the sulfobetaine which had a melting point of 315° C.

The sulfobetaine was recrystallized from acetic anhydride at about 10 ml./g.

The N-methyl-2-chloroquinolinium methyl sulfate was prepared in the following way. In a flask provided with an agitator, a thermometer, and a separating funnel, was placed 163.5 g. (1 mole) of 2-chloroquinoline. Then 126 g. (1 mole) of dimethyl sulfate was slowly added with agitation so that the temperature was maintained under 85° C. A quarter of an hour after the addition was completed cold ether was added and the oil formed was decanted. This oil crystallized upon the addition of acetone. The precipitate was separated and washed with acetone on a filter. The desired product was obtained 245 g. (85%).

EXAMPLE 6

Anhydro 1-ethyl-2-sulfoquinolinium hydroxide

In a 0.5 liter flask fitted with a reflux condenser, an agitator, a thermometer and a separating funnel, was introduced 138.4 g. of N-ethyl-2-quinolone (0.8 mole) melted by heating to 60° C. Then 122.8 g. of phosphorous oxychloride was added at such a rate that the temperature did not go above 90° C. This reaction produced 2-chloro-N-ethylquinolinium phosphorodichloride. After having cooled at 70° C., 100 ml. of pure acetone was introduced in small amounts and the solution was poured at once into an aqueous solution of sodium sulfite prepared in advance by dissolving 201 g. (1.6 moles) of the sulfite in 1.6 liters of water heated to 60° C. then subsequently cooled to 5° C. It is very important that the temperature elevation produced by introduction of the acetone solution be tempered by the addition of crushed ice. There was produced an evolution of sulfur dioxide at the same time that a dense precipitate appeared. After cooling at 20° C., the precipitate was separated on a Büchner funnel, then washed batchwise with 1 liter of cold water, then with 500 ml. of acetone. After drying at 30° C. under vacuum, 189 g. of the crude betaine was obtained with a quantitative yield. This betaine was recrystallized in acetic acid at a rate of 15 ml./g.

The acetone used in this preparation should not contain more than 1% water and 1% alcohol and the precipitation of the sulfobetaine has to be made at between 20° and 50° C.

EXAMPLE 7

Anhydro 3-methyl-2-(β-sulfostyryl)β-naphthothiazolium hydroxide

To 60 ml. of freshly distilled phosphorous oxychloride was added in small quantities and with good stirring 31.7 g. (0.1 mole) of N-methyl-2-benzoylmethylene-β-naphthothiazoline. After the addition was completed, the agitation was continued while heating at reflux for two hours. The solution was cooled, the crystallized product 3-methyl-2-(β-chlorostyryl) - β - naphthothiazolium phosphorodichloride, was filtered, washed with warm benzene and dried under vacuum at room temperatures.

The 41.5 g. of the complex formed was added to a solution of 12.6 g. of sodium sulfite in 36 ml. of water. This was agitated at 80° C. for 15 minutes, then cooled. The precipitate was washed with water then acetone. There was obtained 22.8 g. (60%) of the sulfobetaine which had a melting point of 212° C. and had the following structure:

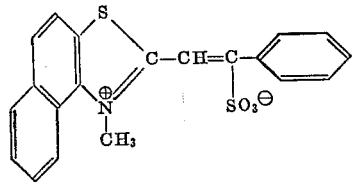

EXAMPLE 8

Anhydro 1-(4-sulfobutyl)-4-sulfopyridinium hydroxide sodium salt

In a three necked flask provided with a mechanical stirrer, and a reflux condenser, was placed 171 g. (1 mole) of 4-phenoxypyridine (prepared as described in French Patent 1,242,962 filed Aug. 25, 1959), 136 g. (1 mole) of 1,4-butanesultone and 100 ml. of acetone. The mixture was heated at reflux for four hours. Little by little the quaternary salt precipitated in a crystalline form; in order to avoid solidifying en mass in the flask, another 300 ml. of acetone was added. The quaternary salt was separated, ground, washed with acetone and dried. There was obtained 298 g. (97%) of the hydroxide of anhydro 4-phenoxy-1-(4-sulfobutyl)pyridinium of the formula:

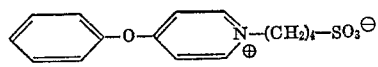

In a two liter flask fitted with a mechanical agitator and connected to a water pump, was placed 307 g. (1 mole) of the composition obtained above and 95 g. (0.5 mole) of sodium metabisulfite and 700 ml. of water. This was heated to boiling for six hours. The water and phenol formed were removed by vacuum. After chilling, a precipitate was formed by the addition of 0.5 liter of acetone and stirring over five minutes. After further agitation, the product was decanted with 500 ml. of acetone, filtered on a Büchner funnel and dried.

There was obtained 317 g. (100%) of the sulfobetaine having the formula:

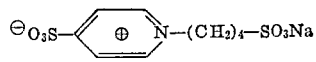

EXAMPLE 9

Anhydro-1-methyl-4-sulfopyridinium hydroxide

Methylmercapto-4-pyridinium methyl sulfate 2.51 g. (0.01 mole) with 0.95 g. (0.005 mole) of sodium metabisulfite in a minimal quantity of water was refluxed for one day. The methylmercaptan evolved was destroyed with hypochlorite solution. Upon evaporating the water in the flask to dryness, there was obtained 4 g. of the pale yellow crystalline product that was washed in boiling methanol to eliminate the residual mercaptans. After filtration on a Büchner funnel, the solid was dissolved in a minimal amount of water and 0.01 mole of barium iodide in water added. The insoluble barium sulfate formed by boiling the water one hour was gathered, and a small amount of carbon was added to the milky liquid, and the barium sulfate removed by filtration on a sintered glass filter. The clear aqueous filtrate was treated with acetone, filtered on a Büchner funnel and the precipitate was washed with methanol to remove the remaining traces of sodium iodide and barium iodide. The 0.5 g. of the sulfobetaine obtained melted at 275° C. and had the formula:

EXAMPLE 10

Anhydro 1-methyl-2-sulfopyridinium hydroxide

To a solution of 20 g. of N-methyl-2-pyridone in 100 ml. of acetone was slowly added 50 ml. of phosphorous oxychloride and the mixture refluxed for 15 minutes. The solvent and excess phosphorous oxychloride were eliminated at a temperature under 60° C. The residual oil was redissolved in 50 ml. of acetone and the solution slowly added with agitation to a solution of 50 g. of sodium metabisulfite in 75 ml. of water, at a temperature not above 50° C. After the evolution of sulfur dioxide has stopped, 100 ml. of ethanol was added and the mixture was refluxed for 10 minutes. After chilling, the inorganic sodium salts were removed by filtration, the mother liquor was concentrated under vacuum and treated with 100 ml. of acetone.

The sulfobetaine was precipitated as an oil which quickly crystallized, with an 80% yield.

EXAMPLE 11

1,1′-diethyl-2,2′-cyanine bromide

Twenty-six grams (0.10 mole+10% excess) of anhydro-1-ethyl-2-sulfoquinolinium hydroxide, prepared as in Example 6, was suspended in 60 ml. of ethanol and 34.3 g. (0.10 mole) of ethyl 2-methylquinolinium p-toluene sulfonate. The mixture was refluxed and 11 g. (0.10 mole+10% excess) of triethylamine was slowly added. After 30 minutes of refluxing, a solution of 15 g. of potassium bromide in 60 ml. of warm water was added with agitation. After chilling for three hours at 5° C., the dye formed was separated on a filter, washed with water, then with acetone. Thirty-two g. (80%) of crude product was obtained. Recrystallization from methanol (7 ml./g.) gave a very pure product (yield 90%).

The synthesis of the same dye can be performed in water and in the cold, as is described below. Technical ethyl quinaldinium bromide, 126 g. (0.5 mole), was dissolved in 800 ml. of water, 5 g. of decolorizing charcoal added and the mixture filtered. To the filtrate 129 g. (0.5 mole+10% excess) of anhydro 1-ethyl-2-sulfoquinolinium hydroxide was added. The suspension was vigorously agitated, then a solution of 20 g. (0.5 mole) of sodium hydroxide in 100 ml. of water was slowly added. The dye formed immediately, however the agitation was continued for 30 minutes after the addition (of sodium hydroxide) was completed, and the aqueous layer on top was decanted. The residue was stirred with 50 ml. of acetone and filtered. The precipitate was dissolved in methanol (7 ml./g.) with charcoal, the solution was filtered and a warm solution of 40 g. of ammonium bromide in 60 ml. of water was added. The dye which precipitated upon chilling was washed with acetone, yielding 122 g. (60%).

EXAMPLE 12

1'-ethyl-3-methylthia-2'-cyanine bromide

In a 2 liter flask fitted with a mechanical agitator, a reflux condenser and a dropping funnel, was placed a suspension of 220 g. (.8 mole) of methyl 2-methylbenzothiazolinium methyl sulfate suspended in 800 ml. of anhydrous methanol, and 208 g. (.8 moles+10% excess) of anhydro 1-ethyl-2-sulfoquinolinium hydroxide. To the cold mixture was added slowly 88 g. (.8 mole+10% excess) of anhydrous triethylamine with good stirring. A complete solution is obtained. The agitation was continued for 30 minutes at room temperature and then the solution was refluxed. A solution of 120 g. of potassium bromide in 250 ml. of warm water was then introduced directly with stirring. After chilling to 7–8° C. for several hours, the dye formed was separated on a Büchner funnel, washed with an aqueous solution of potassium bromide 10/100. The dye was washed with water and then with 800 ml. of warm ethanol. The dye was recrystallized from methanol (8 ml./g.). The yield of dye obtained was 75% to 80%.

EXAMPLE 13

3-carboxymethyl-1'-ethylthia-2'-cyanine bromide

In a three necked 2 liter flask, fitted with a reflux condenser, and a dropping funnel, was introduced 115 g. (.4 mole) of very finely ground carboxymethyl 2-methylbenzothiazolium bromide and 1.2 liters of methanol. The mixture was energetically agitated until completely dissolved, then 104 g. (.4 moles+10% excess) of anhydro 1-ethyl-2-sulfoquinolinium hydroxide was added, then with agitation 44 g. (.4 moles+10% excess) of distilled triethylamine was added as quickly as possible by dropping funnel. The agitation was continued for 15 minutes at room temperature then refluxed for 15 minutes. The dye precipitated while sulfur dioxide was released. The mixture was chilled, filtered upon a Büchner funnel, washed in a beaker with 300 ml. of acetone, filtered and dried under a vacuum at 50° C. A yield of 120 g. of crude dye was obtained.

For purification, the dye was dissolved in 540 ml. of hydrochloric acid (4.5 ml./g.), 5 g. of decolorizing charcoal added, agitated and then filtered on a cloth. The filtrate was poured into 1.2 liters of water, the solid was then filtered, washed with 1.2 liters of water then washed twice with 500 ml. of acetone, air drying and drying under vacuum at 50° C. A yield of 120 g. of the dye was obtained.

EXAMPLE 14

3-ethyl-5-[(1-sulfobutyl)-4(IH)-pyridylidene]-rhodanine

In a 500 ml. flask provided with a mechanical agitator, a reflux condenser and a dropping funnel, was introduced 150 ml. of anhydrous methanol, 31.7 g. (0.1 mole) of the sodium salt of anhydro 1-(4-sulfobutyl)-4-sulfopyridinium hydroxide, prepared as described in Example 8, and 16.1 g. of N-ethylrhodanine (0.1 mole). The mixture was heated to reflux and the rhodanine dissolved. Then 100 ml. of a 2 N (0.2 mole) solution of sodium methylate was added. The sulfobetaine salt progressively disappeared from the suspension, the yellow coloration beginning to intensify and very rapidly a heavy precipitate of dye was noted. The refluxing was continued 30 minutes, then the mixture was chilled to 20°–25° C., filtered and the precipitate washed with warm acetone. After drying, the dye weighed 39 g.

A yield of 30 g. (75%) of purified dye was obtained by crystallizing the dye in acetic acid containing a small amount of decolorizing charcoal, filtering and washing with warm acetone. A second crop (6, 7 g.) of purified dye was recovered by concentrating the filtrate giving a total yield of about 90% compared to a yield of about 20% for the same dye prepared by the conventional method using a reactive ethylthio group. The dye has the structure:

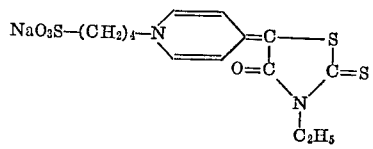

EXAMPLE 15

3-ethyl-5-[1-(4-sulfobutyl)-4-(IH)-pyridylidene]-rhodanine

The same dye of Example 14 was prepared by another synthesis. In a 5 liter flask equipped with an agitator, a reflux condenser and a dropping funnel was introduced 317 g. (1 mole) of the sodium salt of anhydro 1-(4-sulfobutyl)-4-sulfopyridinium hydroxide and 161 g. (1 mole) of N-ethyl rhodanine. At the reflux temperature, 220 g. (2 moles+10% excess) of dry triethylamine was progressively added. The suspension of the betaine gradually disappeared in proportion to the appearance of an intense yellow color. Heating was continued for an hour after completion of the addition (of the amine), the mixture was chilled to 15° C. and the dye was filtered on a Büchner funnel. After drying, the dye weighed 198 g.

To the preceding alcoholic solution was added 40 g. of sodium hydroxide pellets with violent agitation. After agitating for 30 minutes, the precipitated dye was separated on a filter and washed with acetone. After drying the second crop of dye weighed 190 g.

The two fractions were combined and recrystallized in acetic acid (10 ml./g.) with a small amount of decolorizing charcoal. The dye obtained weighed 280 g. (70%).

A large number of other sensitizing dyes can be prepared from our sulfobetaines with considerably larger yields than from conventional intermediates. For example, the yields obtained according to the invention, for 1-ethyl-2-[3-ethyl-4-phenyl-(4-oxazolin-2-ylidene)-methyl]-quinolinium iodide raised to 75%, when it is only 18%, when one uses ethyl 2-iodoquinolinium iodide. The dye 1-ethyl-1'-α-hydroxypropyl-2,2'-cyanine iodide, synthesized by the conventional method with the 1-ethyl-2-phenylmercaptoquinolinium tosylate is obtained in yields beyond 25% compared to 90% yields when made from the sulfobetaines according to the invention.

Although the invention has been described in considerable detail with reference to certain preferred embodiments thereof, it will be understood that variations and modifications can be effected without departing from the spirit and scope of the invention as described hereinabove and as defined in the appended claims.

We claim:

1. A process for preparing a heterocyclammonium sulfobetaine having the formula:

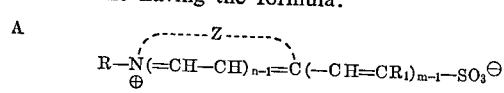

wherein R represents a member selected from the group consisting of an alkyl group, a sulfo-alkyl group, a carboxy-alkyl group, an aryl group, a sulfo-aryl group and a carboxy-aryl group; Z represents the nonmetallic atoms required to complete a 5 to 6 membered heterocyclic nucleus selected from the group consisting of thiazole, benzothiazole, tetrahydrobenzothiazole, naphthothiazole, thionaphtheno-7', 6', 4,5-thiazole, oxazole, benzoxazole, naphthoxazole, selenazole, benzoselenazole, tetrahydrobenzoselenazole, naphthoselenazole, thiazoline, pyridine, quinoline, dialkylindolenine, imidazole, benzimidazole, naphthimidazole, said nucleus being unsubstituted or substituted with at least one member selected from the group consisting of alkyl, aryl, thienyl, chloro, bromo, iodo, methoxy, ethoxy, dioxymethylene, and hydroxy; $m$ represents an integer of from 1 to 2; $n$ represents an integer of from 1 to 2; and $R_1$ represents a member selected from the group consisting of the hydrogen atom, an alkyl group of up to 4 carbon atoms, phenyl, tolyl and benzyl; said process comprising the step of mixing an aqueous solution of an alkali metal sulfite or an alkali metal bisulfite with a compound selected from the group consisting of those represented by the formulas:

B 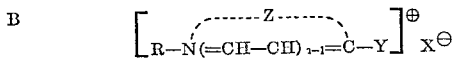

and

C 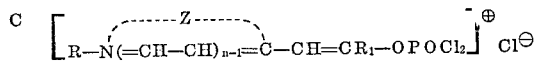

wherein R, Z, $n$ and $R_1$ are as defined previously, Y represents a member selected from the group consisting of a halogen atom, a phenoxy group, a —$OPOCl_2$ group, and a —SR group in which R is as defined previously; and X represents an acid anion; and wherein said process is carried out at a temperature of from room temperature up to the reflux temperature.

2. A process according to claim 1 for preparing anhydro 1-methyl-4-sulfoquinolinium hydroxide wherein said compound having said Formula B is N-methyl-4-chloroquinolinium methyl sulfate and said sulfite is sodium sulfite.

3. A process according to claim 1 for preparing anhydro 3-methyl-2-sulfo-β-naphthothiazolium hydroxide wherein said compound having said Formula B is 2-chloro-3-methyl-β-naphthothiazolium chloride and said bisulfite is sodium metabisulfite.

4. A process according to claim 1 for preparing anhydro 1-ethyl-2-sulfoquinolinium hydroxide wherein said compound having said Formula B is 2-chloro-N-ethylquinolinium phosphorodichloride and said sulfite is sodium sulfite.

5. A process according to claim 1 for preparing anhydro 3-methyl-2-(β-sulfostyryl)-β-naphthothiazolium hydroxide wherein said compound having said Formula C is 3-methyl-2-(β-chlorostyryl)-β-naphthothiazolium phosphorodichloride and said sulfite is sodium sulfite.

6. A process according to claim 1 for preparing ananhydro 1-(4-sulfobutyl)-4-sulfopyridinium hydroxide sodium salt wherein said compound having said Formula B is 4-phenoxy-1-(4-sulfobutyl)-pyridinium hydroxide and wherein said bisulfite is sodium metabisulfite.

References Cited

UNITED STATES PATENTS 2,708,669  5/1955  Larive et al. _____ 260—240.7

JOHN D. RANDOLPH, *Primary Examiner.*

H. I. MOOTY, *Assistant Examiner.*

U.S. Cl. X.R.

260—240.4, 240.6, 240.7, 240.65, 286, 294.8, 298, 302, 306, 306.7, 307, 309, 309.2, 319.1, 326.11